(12) United States Patent
Ahn

(10) Patent No.: US 9,077,026 B2
(45) Date of Patent: Jul. 7, 2015

(54) RECHARGEABLE BATTERY PACK

(75) Inventor: Jang-Gun Ahn, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 675 days.

(21) Appl. No.: 13/079,475

(22) Filed: Apr. 4, 2011

(65) Prior Publication Data

US 2012/0052332 A1    Mar. 1, 2012

(30) Foreign Application Priority Data

Aug. 31, 2010    (KR) .................. 10-2010-0084837

(51) Int. Cl.
*H01M 2/20*    (2006.01)
*H01M 10/42*    (2006.01)

(52) U.S. Cl.
CPC .......... *H01M 2/202* (2013.01); *H01M 10/4207* (2013.01); *H01M 10/425* (2013.01)

(58) Field of Classification Search
CPC ................. H01M 2/34; H01M 10/425; H05K 2201/10916; H05K 2201/10272; H05K 2201/1028; H01R 4/02; H01R 4/09; H01R 9/092; H01R 9/095
USPC ........................................ 429/7, 99, 100, 149
See application file for complete search history.

(56) References Cited

U.S. PATENT DOCUMENTS

2009/0087694 A1* 4/2009 Park .................................. 429/8
2009/0104513 A1   4/2009 Um 2009/0154048 A1   6/2009 Jang et al.
2009/0246615 A1* 10/2009 Park ............................... 429/149
2010/0209743 A1   8/2010 Koh et al.
2011/0262777 A1* 10/2011 Choi et al. ........................ 429/7

FOREIGN PATENT DOCUMENTS

| KR | 1020070033834 A | 3/2007 |
| KR | 1020070065560 A | 6/2007 |
| KR | 1020090022892   | 3/2009 |

(Continued)

OTHER PUBLICATIONS

Korean Notice of Allowance issued by KIPO on Apr. 23, 2012 in connection with Korean Application Serial No. 10-2010-0084837 and Request for Entry of the Accompanying Office Action attached herewith.

(Continued)

*Primary Examiner* — Ula C Ruddock
*Assistant Examiner* — Thomas Parsons
(74) *Attorney, Agent, or Firm* — Robert E. Bushnell, Esq.

(57) ABSTRACT

A rechargeable battery pack that accurately fixes connection locations of a connection tab and a first pad and strengthens the impact resistance of a connection unit. A rechargeable battery pack according to an exemplary embodiment may include a first unit cell and a second unit cell formed by a rechargeable battery; a connection tab electrically connecting the first unit cell and the second unit cell to each other; and a protection circuit module (PCM) where an aperture in the protection circuit module is formed in a first pad connected to the connection tab, wherein the connection tab includes a first portion inserted into the aperture in the protection circuit module, and a second portion bent and connected to the first portion and overlapped with the first pad and including an aperture in the second portion of the connection tab.

11 Claims, 13 Drawing Sheets

(56) References Cited

FOREIGN PATENT DOCUMENTS

| KR | 1020090064961 | 6/2009 |
|----|---------------|--------|
| KR | 10-2009-0104584 A | 10/2009 |

OTHER PUBLICATIONS

Korean Office Action issued by the Korean Patent Office on Sep. 8, 2011 in the corresponding Korean Patent Application No. 2010-0084837.

* cited by examiner

400

RECHARGEABLE BATTERY PACK

CLAIM OF PRIORITY

This application makes reference to, incorporates the same herein, and claims all benefits accruing under 35 U.S.C. §119 from an application for RECHARGEABLE BATTERY earlier filed in the Korean Intellectual Priority Office on 31 Aug. 2010 and there duly assigned Serial No. 10-2010-0084837.

BACKGROUND OF THE INVENTION

1. Field of the Invention

This disclosure relates to a rechargeable battery pack that connects a connection tab connecting unit cells of a rechargeable battery to a protection circuit module.

2. Description of the Related Art

With technological development of and a demand for a mobile apparatus, a demand for a rechargeable battery as an energy source has increased. The rechargeable battery may be used as a single cell type or a pack type electrically connecting a plurality of cells to each other depending on a kind of an apparatus using the rechargeable battery.

In general, a cylindrical rechargeable battery has a capacity larger than an angular rechargeable battery or a pouch-type rechargeable battery. The cylindrical rechargeable batteries are connected to each other in series, in parallel, or a combination thereof to form a rechargeable battery pack in a linear or plate structure.

A cell pack is formed by connecting the unit cells to each other by using a connection tab. The connection tab of the cell pack is also electrically connected to a protection circuit module (PCM) to form the rechargeable battery pack. The protection circuit module is included to protect the cell pack from overcharging, overdischarging, and short-circuit.

The protection circuit module may include a through-hole formed on a copper-clad pad. An end of the connection tab is inserted into the through-hole and the end of the connection tab and the pad are electrically connected to each other by soldering. In this arrangement, soldering locations of the end of the connection tab and the pad that are coupled to each other are arranged on the protection circuit module while being adjacent to a cylindrical unit cell.

During soldering, the cylindrical unit cell can interfere with the soldering process, resulting in the soldering iron tip not being able to accurately access the end of the connection tab and the pad. Consequently, a soldering failure may occur between the end of the connection tab and the pad of the protection circuit.

The above information disclosed in this Background section is only for enhancement of understanding of the background of the described technology and therefore it may contain information that does not constitute prior art as per 35 U.S.C. §102.

SUMMARY OF THE INVENTION

The described technology has been made in an effort to provide a rechargeable battery pack that accurately fixes connection locations of a connection tab to a pad of a protection circuit module, and results in a stronger and more resilient electrical connection between the connection tab and the protection circuit module.

The present invention has also been made in an effort to provide a rechargeable battery pack that improves the soldering quality of the connection tab to the pad by facilitating the handling of a soldering iron.

According to one aspect of the present invention, there is provided a rechargeable battery pack, including a rechargeable battery including a first unit cell and a second unit cell, a connection tab electrically connecting the first unit cell to the second unit cell and a protection circuit module (PCM) including a first pad connected to the connection tab, the first pad being perforated by an aperture in the PCM, wherein the connection tab may include a first portion inserted into the aperture in the first pad of the PCM and a second portion bent with respect to the first portion and connected to the first portion, the second portion may overlap the first pad and being perforated by an aperture.

The rechargeable battery may also include a connector connecting the first pad of the PCM to the connection tab, and the connector may include a connection layer arranged between the first pad and the second portion of the connection tab. The connector may include solder. The PCM may be arranged at one side of the first unit cell and the second unit cell and extends in a direction that is parallel to a first direction defined as connecting the first unit cell to the second unit cell, the aperture in the first pad of the PCM may be a slot having a first width in a second direction perpendicular to the first direction and a first length in the first direction, and the aperture in the second portion of the connection tab may be a slot having a second width in the first direction and a second length in the second direction. The aperture in the second portion of the connection tab may also be arranged within the first portion of the connection tab. The connection tab and the first pad may be connected to each other by a connector, the connector may include a connection layer arranged between the first pad and the second portion of the connection tab, the connection layer may be connected to a top surface of the second portion of the connection tab through the aperture in the second portion of the connection tab. The aperture in the second portion of the connection tab may include a plurality of through-holes separated from each other in the first direction.

The connection tab and the first pad may be connected to each other by a connector, the connector may include a connection layer arranged between the first pad and the second portion of the connection tab, the connection layer may be connected to a top surface of the second portion of the connection tab via the plurality of through-holes. The PCM may be arranged at one side of the first unit cell and the second unit cell and extends in a first direction parallel defined as a direction connecting the first unit cell to the second unit cell, the aperture in the first pad of the PCM may be a slot having a first width in a second direction perpendicular to the first direction and a first length in the first direction, and the aperture in the second portion of the connection tab may be a plurality of micro-holes. The connection tab and the first pad may be connected to each other by a connector, the connector may include a connection layer arranged between the first pad and the second portion of the connection tab, the connection layer may be connected to a top surface of the second portion of the connection tab through the plurality of micro-holes. The connection tab may include an elongation portion that is bent at a first obtuse angle with respect to the second portion, may be connected to the second portion and extends in a first direction along an outer surface of one of the first unit cell and the second unit cell.

The connection tab may include an elongation portion that is bent at an obtuse angle with respect to the second portion and is connected to the second portion, may be connected to the second portion and extend in a first direction on an outer surface of one of the first unit cell and the second unit cell, the second portion may include a first sub-portion connected to the first portion and a second sub-portion that is bent at a right angle with respect to the first sub-portion. The first portion may maintain a free state within the aperture in the first pad of the PCM. The PCM may also include an auxiliary pad arranged on an opposite surface of the PCM than the first pad while being electrically connected to the first pad, and the first portion may further include a support portion that is bent outside of the aperture in the first pad of the PCM and is elastically supported on the auxiliary pad. The PCM may further include an auxiliary pad arranged on an opposite surface of the PCM than the first pad and being electrically connected to the first pad, and the first portion may further include a support portion that is bent outside of the aperture in the first pad of the PCM and is supported on the auxiliary pad through surface contact.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawing in which like reference symbols indicate the same or similar components, wherein.

DETAILED DESCRIPTION OF THE INVENTION

Figure 1:
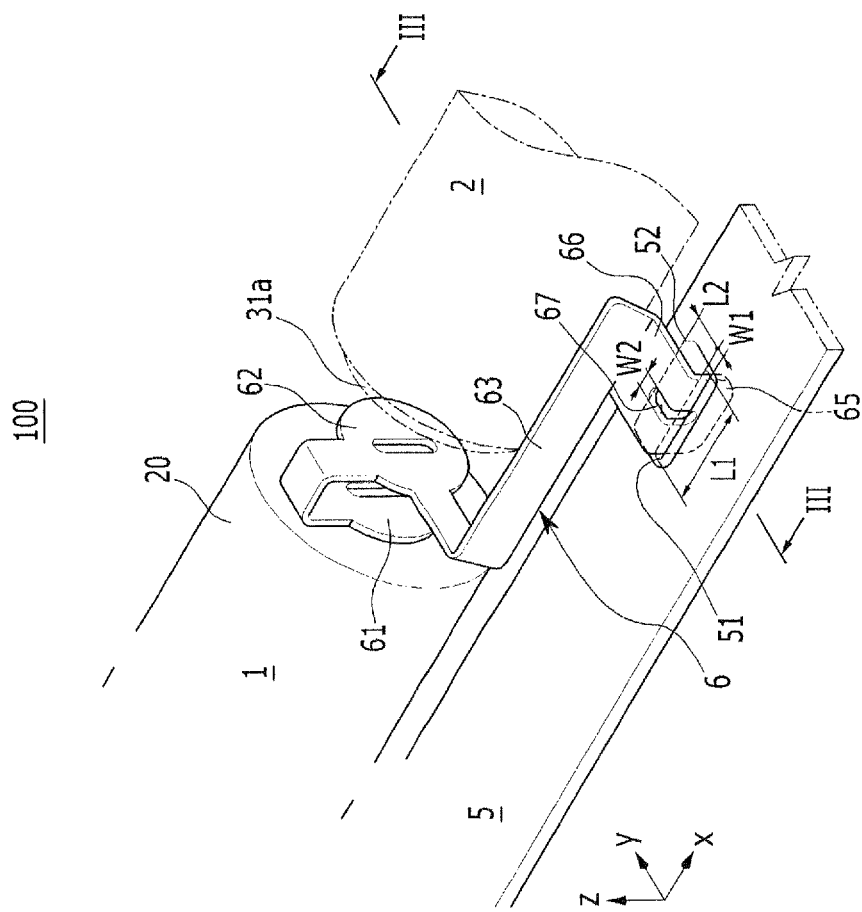
FIG. 1 shows an exploded perspective view of a rechargeable battery pack according to a first exemplary embodiment.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Turning now to FIG. 1, FIG. 1 shows an exploded perspective view of a rechargeable battery pack according to a first exemplary embodiment. Referring to FIG. 1, the rechargeable battery pack 100 includes at least two unit cells 1 and 2 that are rechargeable batteries connected to each other in serial or in parallel to form a cell pack, and a connection tab 6 connecting electrodes of the unit cells 1 and 2 to each other and to a protection circuit module (PCM) 5. A first unit cell 1 and a second unit cell 2 are connected to one end of the connection tab 6, the PCM 5 is connected to another opposite end of the connection tab 6, and an elongation portion 63 connects the two opposite ends of the connection tab 6 to each other, respectively.

Although not shown, a plurality of unit cells may be connected to each of two sections of the connection tab. In this case, the unit cells may be connected to each other in series or in parallel at each section of the connection tab and both sections of the connection tab may be connected to each other in series or in parallel. For example, three unit cells may be connected to each other in parallel at one section of the connection tab, three unit cells may be connected to each other in parallel at another section of the connection tab, and both sides may be connected to each other in series.

Figure 2:
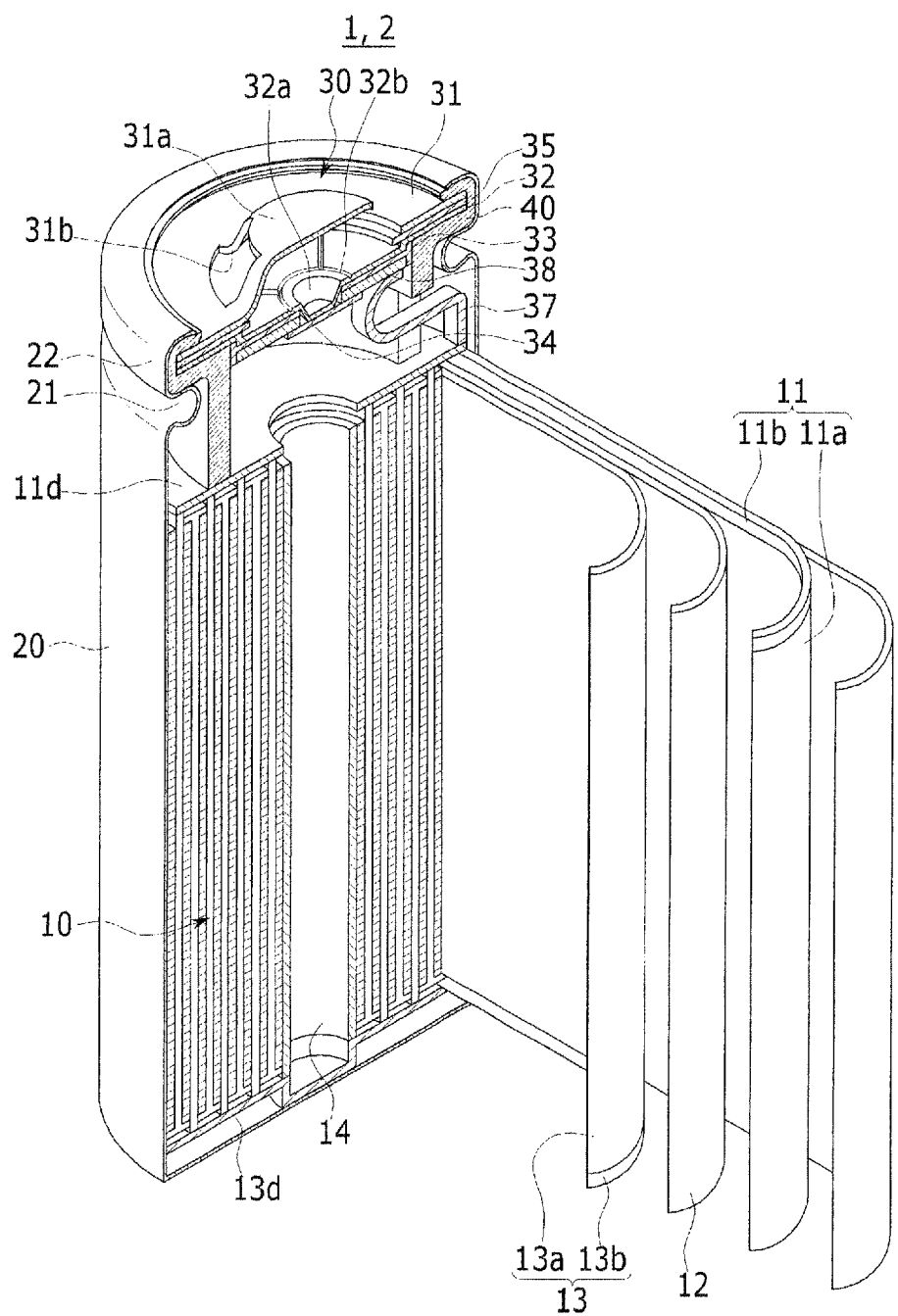
FIG. 2 shows a cross-sectional view of a rechargeable battery of FIG. 1.

Turning now to FIG. 2, FIG. 2 shows a cross-sectional view of a rechargeable battery pack 100 of FIG. 1. Referring to FIG. 2, a rechargeable battery pack 100 including first and second unit cells 1 and 2 will be described as an example. Each of the first and second unit cells 1 and 2 include an electrode assembly 10 generating current, a case 20 accommodating the electrode assembly 10, and a cap assembly 30 coupled to the case 20 and electrically connected to the electrode assembly 10.

The electrode assembly 10 includes a first electrode (hereinafter, referred to as "positive electrode") 11, a separator 12 comprised of an electrical insulator, and a second electrode (hereinafter, referred to as "negative electrode") 13 that are stacked in sequence. The electrode assembly 10 is formed by integrally winding the stack that includes the positive electrode 11, the negative electrode 13, and the separator 12 interposed therebetween. Upon being wound, the electrode assembly 10 can have a desired shape, for example a cylindrical shape or a jellyroll shape. A center pin 14 is disposed at the center of the cylindrical electrode assembly 10. The center pin 14 maintains the cylindrical shape of the electrode assembly 10.

The positive electrode 11 and the negative electrode 13 include coated regions 11a and 13a where an active material is applied to both surfaces of a current collector comprised of a thin-film metallic foil, and uncoated regions 11b and 13b where the active material is not applied and the metallic foil is exposed at opposite sides of the current collector. When wound into a jelly roll state, a positive current collecting plate 11d is connected to the uncoated region 11b of the positive electrode 11 and a negative current collecting plate 13d is connected to the uncoated region 13b of the negative electrode 13.

The case 20 has an opening at one side thereof to allow for insertion of the electrode assembly 10 and is formed in a cylindrical shape to accommodate the cylindrical electrode assembly 10. The case 20 is connected to the negative current collecting plate 13d to serve as a negative terminal for the first and second unit cells 1 and 2 and is made of conductive metal such as aluminum, an aluminum alloy, or nickel plated steel.

The cap assembly 30 is combined to the opening of the case 20 with a gasket 40 interposed therebetween to seal the case 20 accommodating the electrode assembly 10 and an electrolytic solution within. Further, the cap assembly 30 is equipped with a current interrupting device to be electrically connected to the electrode assembly 10. The cap assembly 30 includes a cap plate 31, a vent plate 32, an insulation plate 33, a sub-plate 34, a positive temperature coefficient (PTC) element 35, and a middle plate 38.

The cap plate 31 is finally connected to the positive current collecting plate 11*d* to serve as a positive terminal for the first and second unit cells 1 and 2. A protruding portion 31*a* protruding to the outside of the case 20 and an exhaust port 31*b* opened to the side of the protruding portion 31*a* are formed in the cap plate 31. The positive current collecting plate 11*d* is electrically connected to the cap plate 31 through the connection member 37, the middle plate 38, the sub-plate 34, the vent 32*a*, the vent plate 32, and the positive temperature coefficient element 35.

Substantially, the current interrupting device is formed by the vent plate 32 and the sub-plate 34 and a connection unit of the current interrupting device is formed by welding the vent plate 32 to the sub-plate 34. The vent plate 32 forming one side of the current interrupting device is installed inside of the cap plate 31 and electrically connected to the sub-plate 34 forming the other side of the current interrupting device. Further, the vent plate 32 is broken under a predetermined pressure condition to discharge gas from the first and second unit cells 1 and 2 and includes a vent 32*a* formed to interrupt electrical connection to the sub-plate 34.

When the current interrupting device operates, that is, when the connection unit between the vent plate 32 and the sub-plate 34 are separated from each other due to the breakage of the vent 32*a*, the electrode assembly 10 and the cap plate 31 are electrically isolated from each other. For example, the vent 32*a* protrudes toward the inside of the case 20 from the vent plate 32. The vent plate 32 includes a notch 32*b* guiding the breakage of the vent 32*a* around the vent 32*a*. When pressure is increased by gas generated in the case 20, the notch 32*b* is broken and allows gas to discharge, thereby preventing the first and second unit cells 1 and 2 from exploding.

The positive temperature coefficient element 35 is installed between the cap plate 31 and the vent plate 32 to control current flow between the cap plate 31 and the vent plate 32. When the temperature is higher than predetermined value, the positive temperature coefficient element 35 has an electrical resistance that increases up to an infinite range, interrupting the flow of charged or discharged current.

The sub-plate 34 faces the vent plate 32 with the insulation plate 33 interposed therebetween to be electrically connected to the vent 32*a*. The middle plate 38 is interposed between the insulation plate 33 and the sub-plate 34. The vent 32*a* protruding through through-holes of the insulation plate 33 and the middle plate 38 is connected to the sub-plate 34. Therefore, one side of the middle plate 38 is electrically connected to the vent plate 32 through the sub-plate 34 and the vent 32*a* and the other side is connected to the positive current collecting plate 11*d* through a connection member 37. As a result, the positive current collecting plate 11*d* is electrically connected to the cap plate 31 through the connection member 37, the middle plate 38, the sub-plate 34, the vent 32*a*, the vent plate 32, and the positive temperature coefficient element 35.

The cap assembly 30 formed as described above is engaged with the case 20 and fixed to the case 20 through clamping to complete each of the first and second unit cells 1 and 2. Upon said engagement, a beading portion 21 and a clamping portion 22 are formed in case 20.

Referring back to FIG. 1, the connection tab 6 is formed by a conductor and electrically connects the first unit cell 1 to the second unit cell 2. In the embodiment illustrated in FIG. 1, the connection tab 6 connects the case 20 of first unit cell 1, which serves as the negative terminal of the first unit cell 1, to the protruding portion 31*a* of cap assembly 30 of the second unit cell 2, which serves as the positive terminal of the second unit cell 2. In addition, connection tab 6 elongates toward the second unit cell 2.

As illustrated in FIG. 1, connection tab 6 has a first end that includes first and second plates 61 and 62 electrically connected to each other, and a second and opposite end that has a first portion 65 attached to a second portion 66 which become attached to the PCM 5. The first end of connection tab 6 is used to electrically connect together unit cells 1 and 2 while the second end is used to connect to the PCM 5. The first and second plates 61 and 62 of the first end of connection tab 6 are welded to the first and second unit cells 1 and 2 respectively so that the first and second unit cells 1 and 2 can be electrically connected to each other. In the plate-like connection tab 6, the first unit cell 1 is welded to the first plate 61 and the second unit cell 2 is welded to the second plate 62. The first and second plates 61 and 62 are bent, so the first and second unit cells 1 and 2 are electrically connected to each other through the connection tab 6 that extends in a first direction (x-axis direction) parallel to the first and second unit cells 1 and 2.

The connection tab 6 further includes an elongation portion 63 that connects the first end of connection tab 6 where the unit cells 1 and 2 are attached to the second end where the PCM 5 is attached. The elongation portion 63 is connected to the second plate 62 to be drawn out between the first and second unit cells 1 and 2, is bent outside of the first and second unit cells 1 and 2 and extends parallel to the second unit cell 2. That is, the elongation portion 63 elongates in the x-axis direction connecting the PCM 5 to the first and second unit cells 1 and 2. The second end of the connection tab 6 further includes a first portion 65 and a second portion 66 to electrically and mechanically connect the elongation portion 63 to a first pad 52 of the PCM 5. First portion 65 and second portion 66 of connection tab 6 are arranged at an opposite end of the connection tab 6 from first and second plates 61 and 62.

The protection circuit module 5 is mounted with protection circuit elements (not shown) to prevent the first and second unit cells 1 and 2 from overcharging, overdischarging, outputting an excessive current and short-circuiting. For example, the protection circuit module 5 is arranged to extend along the x-axis direction parallel to the first and second unit cells 1 and 2 and is narrow in the y-axis direction. Accordingly, spatial utilization may be increased in the rechargeable battery pack 100.

The first pad 52 may be a copper-clad pattern to be electrically connected to a circuit substrate of the PCM 5. The first pad 52 includes an aperture 51 in the PCM 5 in order to strengthen mechanical and electrical connection to the connection tab 6. Further, the aperture 51 in the PCM 5 is arranged to penetrate the first pad 52 and the PCM 5 in a straight line. The first pad 52 is spaced-apart from the second unit cell 2 by a predetermined gap to ensure that there is adequate space for a soldering iron tip (not shown) to solder connection tab 6 to first pad 52 of the PCM 5.

At the end of connection tab 6 that attaches to first pad 52 of the PCM 5, the first portion 65 is bent by a right angle with respect to second portion 66. The first portion 65 is inserted into the aperture 51 of the PCM 5 and the second portion 66 overlaps first pad 52 of the PCM 5. The second portion 66 is also bent with respect to elongation portion 63 so that second portion 66 extends in the y-axis direction towards the elongation portion 63. Since the elongation portion 63 abuts unit cell 2, the second portion 66 has a predetermined length along the y-axis direction from the second unit cell 2 to the aperture 51 of the PCM 5. That is, the first portion 65 may be inserted into the aperture 51 of first pad 52 of the PCM 5 at a location that is separated from the second unit cell 2 by this predetermined length of second portion 66. The second portion 66 is electrically connected to the first pad 52 and includes an aperture 67 therein. Therefore, before soldering, the first pad 52 is partially exposed to the top through the aperture 67 in second portion 66 of the second end of connection tab 6.

The first portion 65 of connection tab 6 is inserted vertically downward from the top of the first pad 52 through the aperture 51 of the PCM 5. That is, the connection tab 6 and the PCM 5 are mechanically coupled to each other with ease. In the insertion state, the second portion 66 surface-contacts the first pad 52. Since the second portion 66 of the connection tab 6 does not protrude upwards on the first pad 52 but is separated from the second unit cell 2, the second portion 66 and the first pad 52 can be soldered together with ease. This is because the connection tab 6 maintains an access space to allow the soldering iron tip (not shown) to reach the second portion 66, the first pad 52 and the apertures 67 and 51 without being interfered by unit cell 2.

Figure 3:
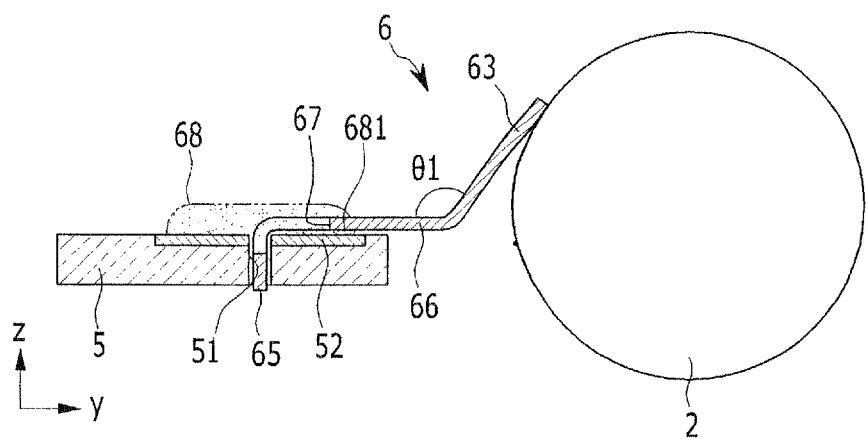
FIG. 3 shows a cross-sectional view taken along line III-III of FIG. 1.
Figure 4:
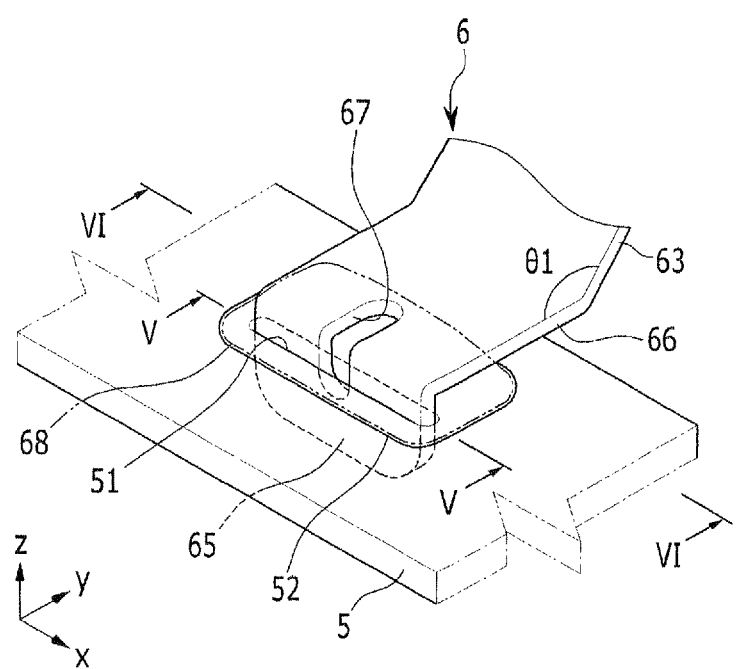
FIG. 4 shows a perspective view of a connection state between a connection tab and a pad of a protection circuit module in FIG. 1.

Turning now to FIGS. 3 and 4, FIG. 3 shows a cross-sectional view taken along line III-III of FIG. 1 and FIG. 4 shows a perspective view of a connection state between a connection tab and a first pad of a protection circuit module of FIG. 1. Referring to FIGS. 3 and 4, the first portion 65 of the connection tab 6 is inserted into aperture 51 in first pad 52 of the PCM 5 and the second portion 66 and the first pad 52 are soldered to each other while the second portion 66 overlaps first pad 52 to form a connector 68. The connection tab 6 and the first pad 52 are mechanically and electrically connected to each other through the connector 68.

Figure 5:
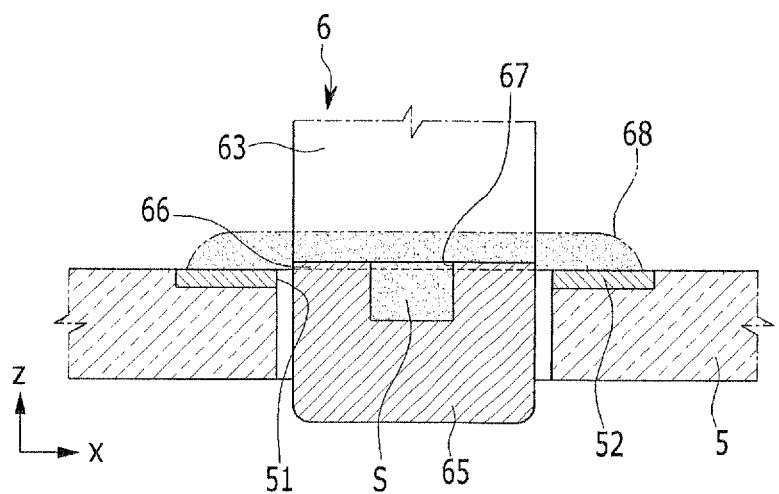
FIG. 5 shows a cross-sectional view taken along line V-V of FIG. 4.
Figure 6:
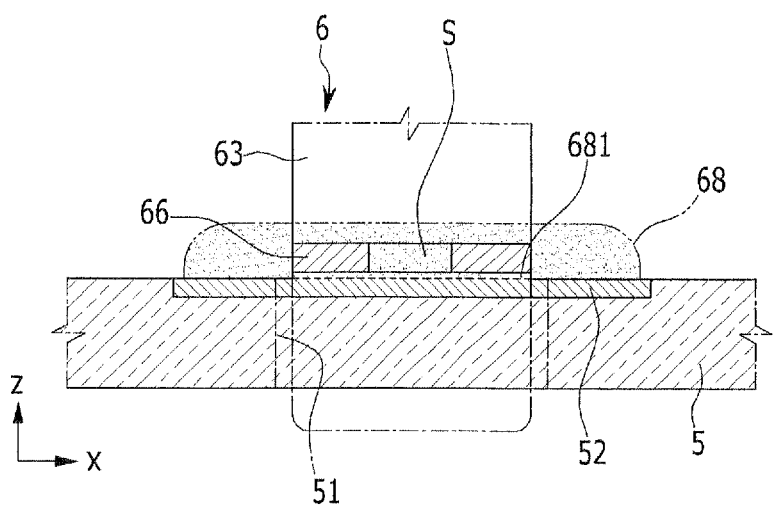
FIG. 6 shows a cross-sectional view taken along line VI-VI of FIG. 4.

Referring to FIG. 1, the aperture 51 in first pad 52 of the PCM 5 is a slot that has a first width W1 in the second direction (y-axis direction) perpendicular to the x-axis direction and a first length L1 in the x-axis direction. That is, the aperture 51 in first pad 52 of the PCM 5 is arranged to correspond to the first portion 65 of connection tab 6. The aperture 67 at the second end of connection tab 6 is a slot having has a second width W2 in the x-axis direction and a second length L2 in the y-axis direction. The aperture 67 at the second end of connection tab 6 is partially arranged within the second portion 66 and is partially arranged in the first portion 65 of the connection tab 6. As shown in FIGS. 3 and 4, the aperture 67 at the second end of connection tab crosses the aperture 51 of first pad 52 of the PCM 5. Turning now to FIGS. 5 and 6, FIG. 5 shows a cross-sectional view taken along line V-V of FIG. 4 and FIG. 6 shows a cross-sectional view taken along line VI-VI of FIG. 4. Referring to FIGS. 5 and 6, the connector 68 is formed by soldering and connects the second portion 66 of the connection tab 6 to the top surface of the first pad 52. During soldering, the aperture 67 in connection tab 6 guides the solder in the vicinity of the second portion 66 to the space between the second portion 66 and the first pad 52. Therefore, the connector 68 further includes a connection layer 681 introduced between the first pad 52 and the second portion 66 of connection tab 6 that surface-contacts each other. Since aperture 51 of first pad 52 and aperture 67 of connection tab 6 cross each other, the solder introduced into the aperture 67 of connection tab 6 may be effectively guided into the space between the second portion 66 of connection tab 6 and first pad 52 through the aperture 51 in first pad 52 of the PCM 5. That is, the connection layer 681 mechanically and electrically connects the second portion 66 of connection tab 6 to first pad 52 of the PCM 5. This connection layer 681 may be further connected to the top surface of the second portion 66 through the solder S filled within aperture 67 (see FIG. 6). Accordingly, the connection layer 681 further strengthens the impact resistance of connector 68 while reducing the electrical resistance of connector 68 that connects the connection tab 6 to the PCM 5.

Since the solder S filled within aperture 67 of connection tab 6 further connects the inner surface of aperture 51 to the first portion 65 of connection tab 6 through an extended portion of the first portion 65, it is possible to further improve the impact resistance while reducing the electrical resistance of the connector 68 (see FIG. 5).

Referring now to FIGS. 3, 5, and 6, the aperture 51 passes through first pad 52 and further passes through the PCM 5. Therefore, the first portion 65 may maintain a free state while being inserted into the aperture 51. That is, the first portion 65 of connection tab 6 includes a free end which is free in the z-axis direction. Therefore, the first portion 65 of the connection tab 6 may be easily inserted into the aperture 51 of the PCM 5.

Referring now to FIGS. 3 and 4, the elongation portion 63 and the second portion 66 of connection tab 6 are bent with respect to each other at a first obtuse angle θ1 with respect to the yz plane and are connected to each other. The first obtuse angle θ1 allows the second portion 66 of connection tab 6 to be soldered to first pad 52 of the PCM 5 without the soldering iron tip being interfered by the first and second unit cells 1 and 2. This is because the aperture 51 and aperture 67 are a distance equal to the length of second portion 66 in the y-axis direction from unit cell 2.

Hereinafter, various exemplary embodiments will be described and a description of the same components will be omitted and different components will be compared to each other by comparing with the first exemplary embodiment to the following exemplary embodiments.

Figure 7:
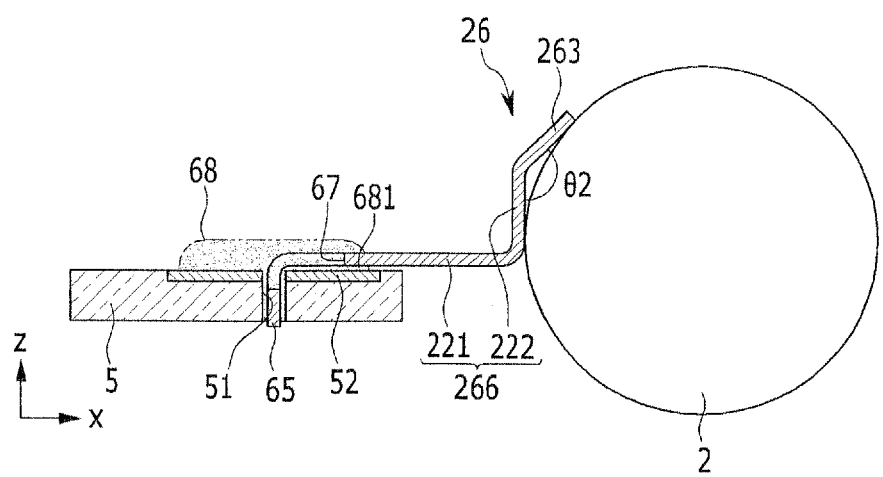
FIG. 7 shows a cross-sectional view of a rechargeable battery pack according to a second exemplary embodiment.

Turning now to FIG. 7, FIG. 7 shows a cross-sectional view of a rechargeable battery pack 200 according to a second exemplary embodiment. Referring to FIG. 7, in a connection tab 26, a second portion 266 includes a first sub-portion 221 connected to a first portion 65 and a second sub-portion 222 connected to elongation portion 263. One end of second sub-portion 222 is bent at a right angle with respect to first sub-portion 221 and an opposite end of second sub-portion 222 is bent by an obtuse angle θ2 with respect to elongation portion 263.

In the first exemplary embodiment, the connection tab 6 is contact-supported onto the second unit cell 2 through the elongation portion 263. In contrast, in the second exemplary embodiment, the connection tab 26 is contact-supported onto the second unit cell 2 through both the elongation portion 263 and the second sub-portion 222 of the second portion 266. As a result, the connection tab 26 and the PCM 5 form a more mechanically stable structure.

Figure 8:
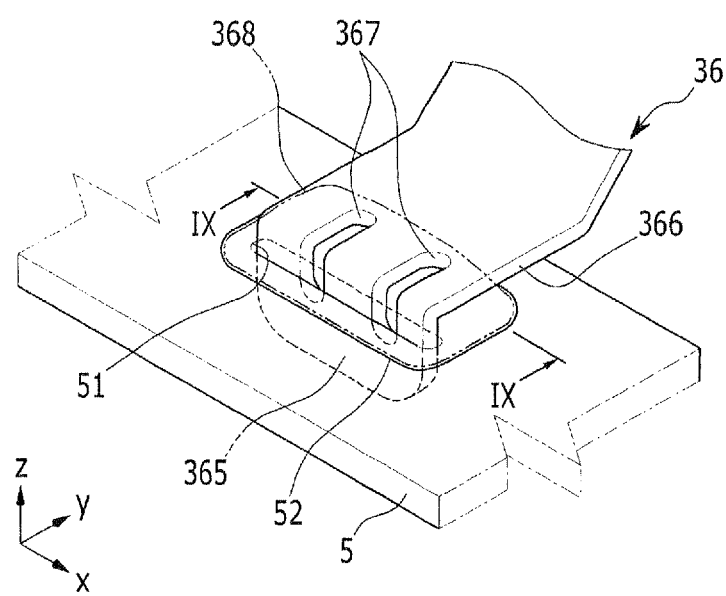
FIG. 8 shows a perspective view of a connection state between a connection tab and a pad of a protection circuit module in a rechargeable battery pack according to a third exemplary embodiment.
Figure 9:
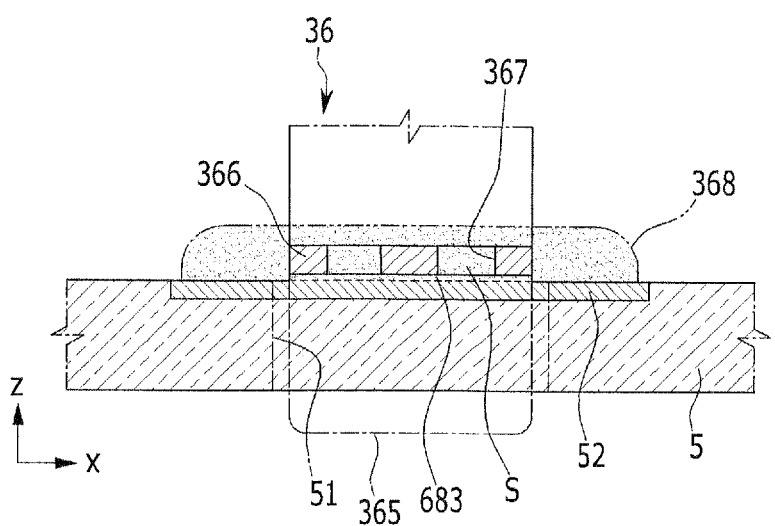
FIG. 9 shows a cross-sectional view taken along line IX-IX of FIG. 8.

Turning now to FIGS. 8 and 9, FIG. 8 shows a perspective view of a connection state between a connection tab 36 and a first pad 52 of a PCM 5 in a rechargeable battery pack 300 according to a third exemplary embodiment and FIG. 9 shows a cross-sectional view taken along line IX-IX of FIG. 8. Referring to FIGS. 8 and 9, a plurality of apertures 367 perforate the end of connection tab 36 that connects to the PCM 5, each of the apertures being spaced-apart from each other in an x-axis direction in the second portion 366 and in the first portion 365 of connection tab 36.

In the first exemplary embodiment, only one aperture 67 perforates connection tab 6 in the vicinity of the first and second portions 65 and 66. In contrast, in the third exemplary embodiment, a plurality of apertures perforate connection tab 36 in the vicinity of the first and second portions 365 and 366.

In connector 368, a connection layer 683 is arranged between first pad 52 and second portion 366 of connection tab 36, the connector 368 being connected to the second portion 366 through the plurality of apertures 367 in the connection tab 36. The connection layer 683 may further be connected to the top surface of the second portion 366 through solder S filled within the plurality of apertures 367 in connection tab 36 (see FIG. 9). Accordingly, the connection layer 683 further strengthens the impact resistance of the connector 368 while reducing the electrical resistance of the connector 368 connecting the connection tab 36 to the PCM 5.

Figure 10:
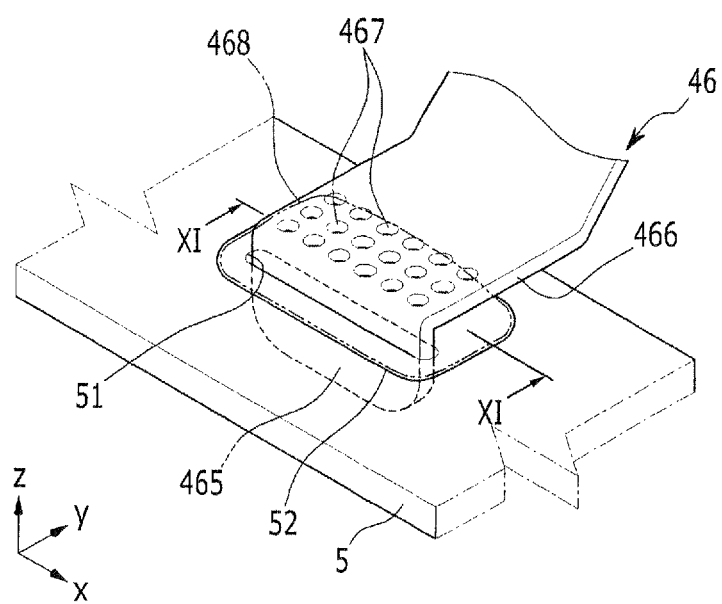
FIG. 10 shows a perspective view of a connection state between a connection tab and a pad of a protection circuit module in a rechargeable battery pack according to a fourth exemplary embodiment.
Figure 11:
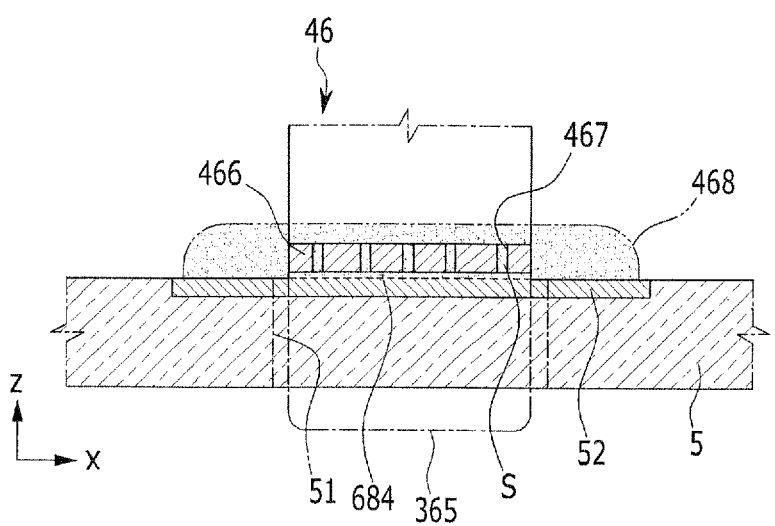
FIG. 11 shows a cross-sectional view taken along line XI-XI of FIG. 10.

Turning now to FIGS. 10 and 11, FIG. 10 shows a perspective view of a connection state between a connection tab 46 and a first pad 52 of a PCM 5 in a rechargeable battery pack 400 according to a fourth exemplary embodiment and FIG. 11 shows a cross-sectional view taken along line XI-XI of FIG. 10. Referring to FIGS. 10 and 11, the second portion 466 of connection tab 46 includes a plurality of micro-apertures arranged in a 2-dimensional matrix.

In connector 468, a connection layer 684 is arranged between first pad 52 and second portion 466 and is connected to the second portion 466 through the 2-dimensional array of micro-apertures 467 perforating connection tab 46. The connection layer 684 may further be connected to the top surface of the second portion 466 through solder S filled within the 2-dimensional array of micro-apertures 467 in second portion 466 of connection tab 46 (see FIG. 11). Accordingly, the connection layer 684 further strengthens the impact resistance of the connector 468 while further reducing the electrical resistance of the connector 468 connecting the connection tab 46 to the first pad 52 of the PCM 5.

Figure 12:
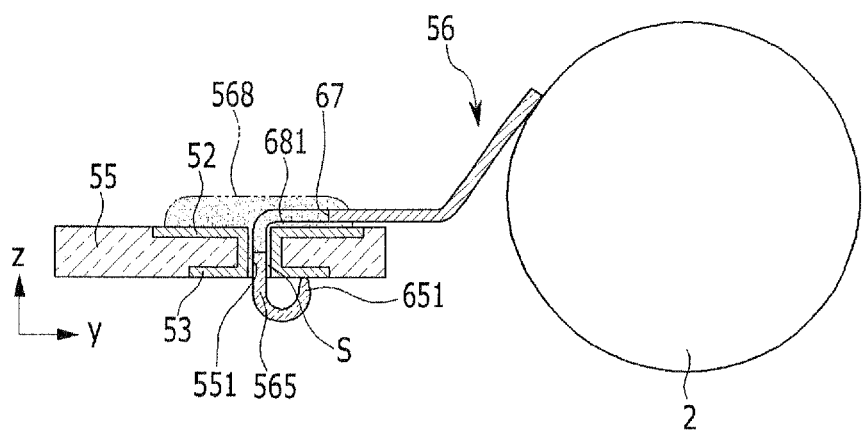
FIG. 12 shows a cross-sectional view of a rechargeable battery pack according to a fifth exemplary embodiment.

Turning now to FIG. 12, FIG. 12 shows a cross-sectional view of a rechargeable battery pack 500 according to a fifth exemplary embodiment. Referring to FIG. 12, a PCM 55 further includes an auxiliary pad 53 arranged on an opposite surface of the PCM 55 than first pad 52. The auxiliary pad 53 is electrically connected to first pad 52 through an aperture 551 perforating the PCM 55. The first pad 52 and the auxiliary pad 53 form a conductive via hole structure. A first portion 565 of connection tab 56 further includes a support portion 651 arranged on a same side of the PCM 55 as auxiliary pad 53. The support portion 651 is bent at the first portion 565 outside the aperture 551 of the PCM 55 and is elastically supported on auxiliary pad 53.

In the first exemplary embodiment, the first portion 65 includes a free end arranged within the aperture 51 of the PCM 5. In contrast, in the fifth exemplary embodiment, since the first portion 565 further includes the support portion 651 supported on auxiliary pad 53, it is possible to strengthen a mechanical coupling structure between the connection tab 56 and the PCM 55 and reduce the electrical resistance of connector 568. The support portion 651 may be formed by inserting the first portion 565 into the aperture 551 of the PCM 55 and then bending a portion of first portion 565 that protrudes from aperture 551 of the PCM 55. The support portion 651 restrains the z-axis direction movement of the first portion 565 in the aperture 551 of the PCM 55.

In the connector 568, solder S introduced through aperture 67 in connection tab 56 and fills between the inner surface of aperture 551 and first portion 565 of connection tab 56, further strengthening the impact resistance of the connector 568 while further reducing the electrical resistance of connector 568 connecting the connection tab 56 to the PCM 55.

Figure 13:
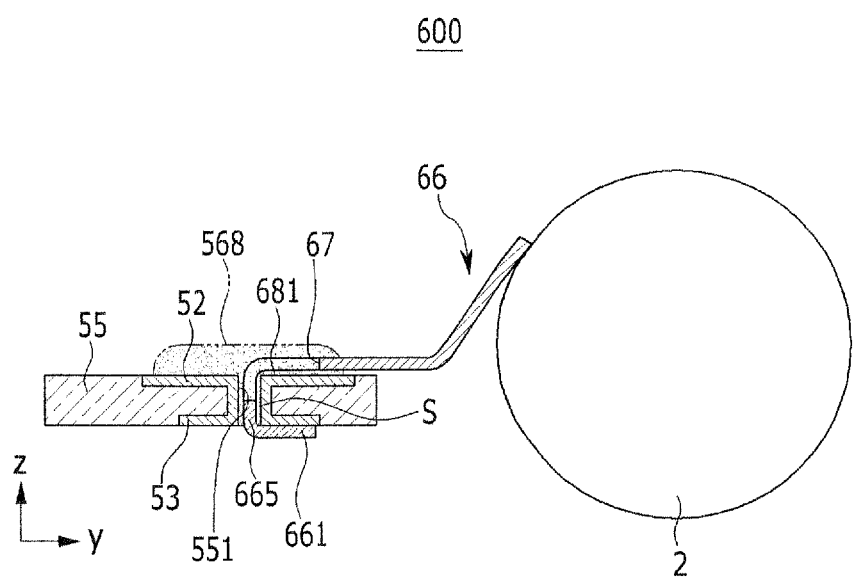
FIG. 13 shows a cross-sectional view of a rechargeable battery pack according to a sixth exemplary embodiment.

Turning now to FIG. 13, FIG. 13 shows a cross-sectional view of a rechargeable battery pack 600 according to a sixth exemplary embodiment. Referring to FIG. 13, a first portion 665 of connection tab 66 further includes a support portion 661 that is supported on auxiliary pad 53 through surface contact.

In the fifth exemplary embodiment, the first portion 565 of connection tab 56 included a support portion 651 that is elastically supported on auxiliary pad 53. In contrast, in the sixth exemplary embodiment, the first portion 665 is bent outside aperture 551 of the PCM 55 so that support portion 661 surface-contacts auxiliary pad 53 to strengthen the mechanical coupling structure between connection tab 66 and the PCM 55 and to reduce electrical resistance.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery pack, comprising:
   a rechargeable battery including a first unit cell and a second unit cell;
   a connection tab electrically connecting the first unit cell to the second unit cell;
   a protection circuit module including a first pad connected to the connection tab, the first pad being perforated by an aperture in the protection circuit module,
   the connection tab includes:
      a distal end portion inserted into the aperture in the first pad of the protection circuit module;
      a second portion bent with respect to the distal end portion and connected to the distal end portion, the second portion overlapping the first pad and being perforated by an aperture; and
      a connector connecting the first pad to the connection tab, and the connector including a connection layer arranged between the first pad and the second portion, the connection layer being connected to a surface of the distal end portion and a top surface of the second portion completely through the aperture in the second portion.

2. The rechargeable battery pack of claim 1, the connector is comprised of solder.

3. The rechargeable battery pack of claim 1, the protection circuit module is arranged at one side of the first unit cell and the second unit cell and extends in a direction that is parallel to a first direction defined as connecting the first unit cell to the second unit cell,
   the aperture in the first pad of the protection circuit module being a slot having a first width in a second direction perpendicular to the first direction and a first length in the first direction, and
   the aperture in the second portion of the connection tab is a slot having a second width in the first direction and a second length in the second direction.

4. The rechargeable battery pack of claim 3, the aperture in the second portion of the connection tab is also arranged within the distal end portion of the connection tab.

5. The rechargeable battery pack of claim 3, the aperture in the second portion of the connection tab comprises a plurality of through-holes separated from each other in the first direction.

6. The rechargeable battery pack of claim 1, the connection tab includes an elongation portion that is bent at a first obtuse angle with respect to the second portion, is connected to the second portion and extends in a first direction along an outer surface of one of the first unit cell and the second unit cell.

7. The rechargeable battery pack of claim 1, the connection tab includes an elongation portion that is bent at an obtuse angle with respect to the second portion and is connected to the second portion, and extends in a first direction on an outer surface of one of the first unit cell and the second unit cell,
the second portion includes a first sub-portion connected to the distal end portion and a second sub-portion that is bent at a right angle with respect to the first sub-portion.

8. The rechargeable battery pack of claim 1, the distal end portion maintains a free state within the aperture in the first pad of the protection circuit module.

9. The rechargeable battery pack of claim 1, the protection circuit module further includes an auxiliary pad arranged on an opposite surface of the protection circuit module than the first pad while being electrically connected to the first pad, and the distal end portion further includes a support portion that is bent outside of the aperture in the first pad of the protection circuit module and is elastically supported on the auxiliary pad.

10. The rechargeable battery pack of claim 1, the protection circuit module further includes an auxiliary pad arranged on an opposite surface of the protection circuit module than the first pad and being electrically connected to the first pad, and the distal end portion further includes a support portion that is bent outside of the aperture in the first pad of the protection circuit module and is supported on the auxiliary pad through surface contact.

11. The rechargeable battery pack of claim 1, the protection circuit module is arranged at one side of the first unit cell and the second unit cell and extends in a first direction parallel defined as a direction connecting the first unit cell to the second unit cell,
the aperture in the first pad of the protection circuit module being a slot having a first width in a second direction perpendicular to the first direction and a first length in the first direction, and
the aperture in the second portion of the connection tab being a plurality of micro-holes.

* * * * *